(12) United States Patent
Kazuo

(10) Patent No.: US 11,480,809 B2
(45) Date of Patent: Oct. 25, 2022

(54) CAMERA DEVICE WITH HAND-SHAKE CORRECTION FUNCTION

(71) Applicant: AAC Optics Solutions Pte. Ltd., Singapore (SG)

(72) Inventor: Shikama Kazuo, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 323 days.

(21) Appl. No.: 16/817,644

(22) Filed: Mar. 13, 2020

(65) Prior Publication Data
US 2021/0199983 A1 Jul. 1, 2021

(30) Foreign Application Priority Data
Dec. 27, 2019 (JP) .............................. JP2019-238594

(51) Int. Cl.
| | |
|---|---|
| *G02B 27/64* | (2006.01) |
| *G02B 7/182* | (2021.01) |
| *G03B 5/00* | (2021.01) |
| *G02B 13/00* | (2006.01) |
| *G03B 17/17* | (2021.01) |
| *G03B 30/00* | (2021.01) |

(52) U.S. Cl.
CPC ........... *G02B 27/646* (2013.01); *G02B 7/182* (2013.01); *G02B 13/0065* (2013.01); *G03B 5/00* (2013.01); *G03B 17/17* (2013.01); *G03B 30/00* (2021.01); *G03B 2205/0023* (2013.01); *G03B 2205/0069* (2013.01)

(58) Field of Classification Search
CPC .. G02B 27/646; G02B 7/182; G02B 13/0065; G03B 5/00; G03B 17/17; G03B 30/00; G03B 2205/0023; G03B 2205/0069
See application file for complete search history.

(56) References Cited

U.S. PATENT DOCUMENTS

2006/0268431 A1* 11/2006 Jin ....................... G02B 27/646
 359/726
2018/0239161 A1* 8/2018 Seol ..................... G02B 7/1821

FOREIGN PATENT DOCUMENTS

JP S613005 B1 11/2019

* cited by examiner

*Primary Examiner* — Cara E Rakowski
(74) *Attorney, Agent, or Firm* — W&G Law Group

(57) ABSTRACT

The present disclosure provides a camera device including a deflected optical system and provided with an anti-shake mechanism without increasing a size of the camera device. The optical system includes a reflection member that deflects an optical axis, and it sequentially includes, from an object side, a reflection member, camera lens groups, and a camera element, to rotate the reflection member with an axis perpendicular to a plane defined by an optical axis of the camera lens groups and an optical axis at the object side reflected by the reflection member, and an axis parallel to the optical axis at the reflected object side being rotation axes, in such a manner that a hand-shake is corrected.

16 Claims, 8 Drawing Sheets

CAMERA DEVICE WITH HAND-SHAKE CORRECTION FUNCTION

TECHNICAL FIELD

The present disclosure relates to a camera device with a hand-shake correction function.

BACKGROUND

With the rapid development of photography technology, lens driving devices are widely used in a large number of camera devices. Application of the lens driving devices to various portable electronic devices, such as a mobile phone, a tablet computer, etc., is particularly accepted by consumers.

A driving mechanism of a lens driving device suitable for a general portable electronic device is typically formed of a coil and a magnet, and the coil is fixed to a periphery of a lens frame. When a current is applied to the coil, through an electromagnetic force, the coil can move the lens frame along an optical axis direction of a lens, so as to focus a focus. In addition, when a user takes images while holding an electronic device with his or her hand, a shake of the lens driving device is caused by hand-shake, and such hand shake can be corrected by a driving in a direction perpendicular to the optical axis. However, for example, in a small optical device equipped on a portable electronic device, it is difficult for a zoom optical system having a relatively long total optical length to be equipped directly on the portable electronic device, and a structure such as a deflected one is required. In addition, in an optical device, which is equipped with a device that includes a device changing an optical magnification on an image surface by moving the optical system in the optical axis direction and being referred to as optical zoom, tends to have a longer total optical length.

In this optical system using a deflected structure, one example is to use lenses, which are arranged in front of and behind a prism or a reflective mirror that deflects light, for shake correction, or it is a case where at least one lens of the lens group moved by the optical zoom is moved by shake correction. However, in miniaturization of the portable electronic devices, by using the shake correction structure of the lenses arranged in front of and behind them, and using the shake correction structure that can move at least one lens of the lens group, it is possible to lengthen the total length of the deflected optical system, or it can become a structure of which a part has a protruding shape.

Therefore, it is necessary to provide a new lens driving device capable of solving the above problems.

SUMMARY

In view of the above, an anti-shake mechanism is provided and will not increasing a size of a camera device when anti-shake mechanism is configured to perform a hand-shake correction in the camera device of a deflected camera device, which saves space.

An anti-shake mechanism of a deflected camera device is provided. The deflected camera device includes an optical system, the optical system includes a reflection member, and the anti-shake mechanism is configured to perform a hand-shake correction by rotating the reflection member in the deflected camera device. The reflection member includes a reflection surface configured to deflect an optical axis. The reflection member is arranged closer to an object side than camera lens groups in such a manner that the reflection member rotates around a first rotation axis and a second rotation axis being rotation axes, the first rotation axis being an axis perpendicular to a plane defined by an optical axis of the camera lens groups and an optical axis at the object side reflected by the reflection member, and the second rotation axis being an axis parallel to the optical axis of the reflected object side. A ball member is used as a sliding portion that enables the reflection member to smoothly rotate. An electromagnetic actuator is provided to drive a driving member for rotation, and the electromagnetic actuator includes a mechanism for holding the sliding portion and a shake elimination mechanism.

In an embodiment, the reflection surface of the reflection member is symmetrical with respect to the first rotation axis and the second rotation axis, and the anti-shake mechanism is equipped with the electromagnetic actuator at an outermost portion.

In an embodiment, the electromagnetic actuator is a voice coil motor.

In an embodiment, a force applying direction of the electromagnetic actuator as a force applying unit is the same as a direction in which at least one permanent magnet and at least one magnet yoke of the electromagnetic actuator attract each other.

In an embodiment, the at least one magnet yoke is arranged on an anti-shake base; the mechanism for holding the sliding portion includes a first holder provided with a first permanent magnet and a second holder provided with the second permanent magnet, the first holder is held on the second holder through a first ball member in such a manner that the first holder freely rotates around the first rotation axis, the second holder is held on the anti-shake base by a second ball member different from the first ball member in such a manner that the second holder freely rotates around the second rotation axis, the ball member includes the first ball member and the second ball member, and the at least one permanent magnet includes the first permanent magnet the second permanent magnet; and with respect to the at least one magnet yoke arranged on the anti-shake base, the first permanent magnet of the first holder presses the first to third ball members across the second holder.

In an embodiment, a device that changes an optical power of an image surface by moving two or more lens groups of the camera lens groups in the deflected optical axis is provided in the camera lens groups.

In an embodiment, the reflection member is a prism.

In an embodiment, the reflection member is a mirror.

A camera device, such as a camera, including the anti-shake mechanism of the deflected camera device as described above is provided by the present disclosure.

A portable electronic device, such as a smart phone, including the deflected camera device as described above is provided by the present disclosure The deflected camera device provided by the present disclosure performs handshake correction by rotating the reflection member, which compared with utilizing a lens in an imaging optical system or a reflection member in the imaging optical system to perform hand-shake correction, it is possible to reduce an impact on an image surface. In addition, the first permanent magnet yoke of the electromagnetic actuator as the force applying unit can be used to eliminate shake and applied force. Therefore, other components for applying force are not needed, which facilitates the miniaturization and convenient assembly achieved by the substantial reduction in components.

Since a movable range can be minimized with respect to a hand-shake correction angle, a more efficient anti-shake mechanism in a portable electronic device that has been miniaturized is formed, which achieves a good quality of captured images.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

SYMBOL DESCRIPTION

Figure 1:
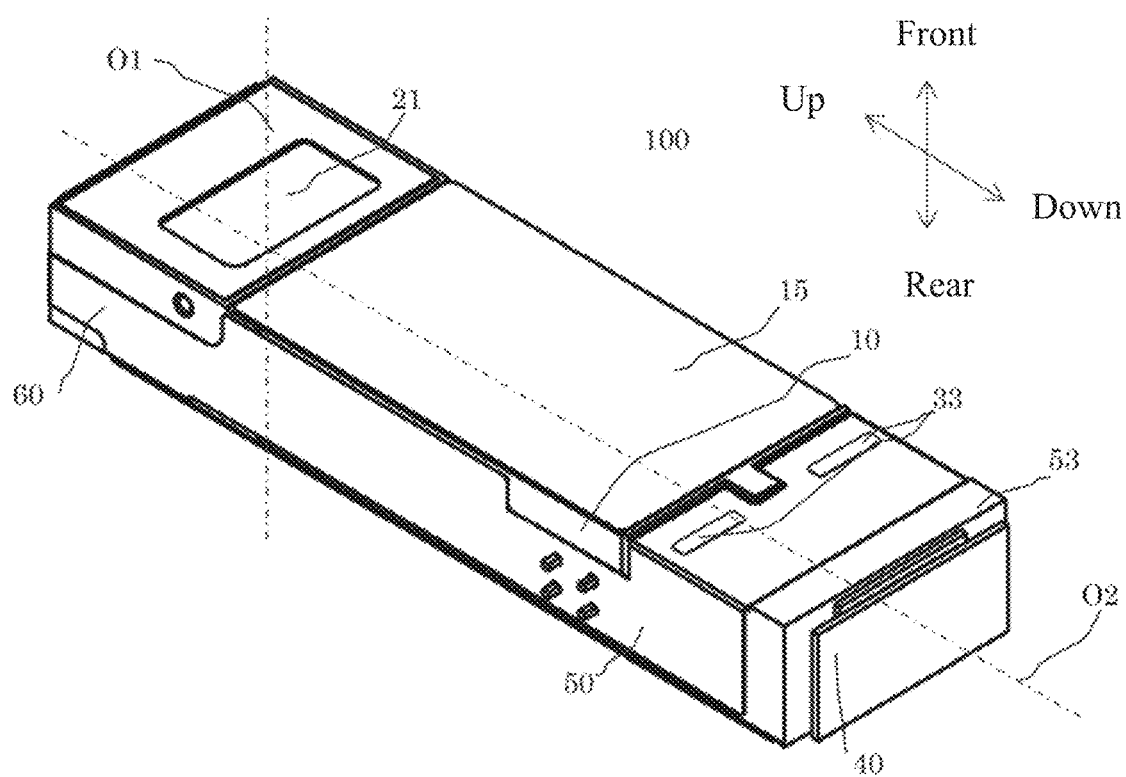
FIG. 1 is a perspective view of a deflected camera device according to an embodiment of the present disclosure when viewing from a lower front side.
Figure 2:
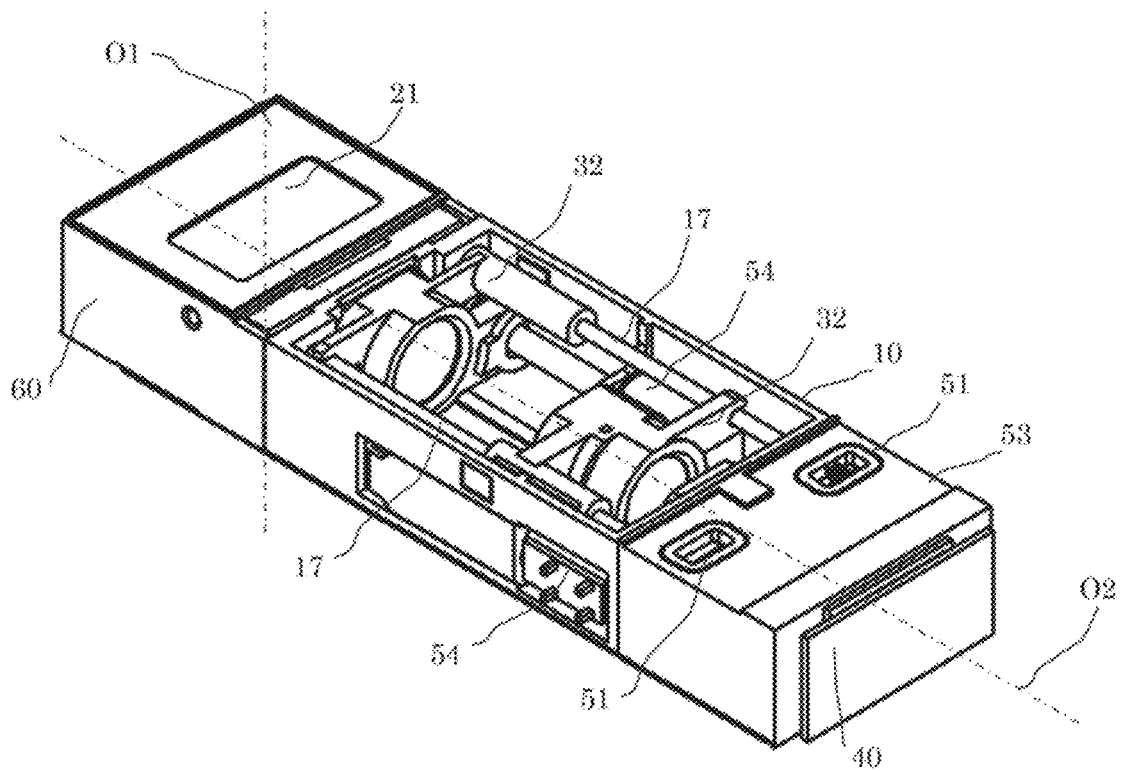
FIG. 2 is a perspective view of a deflected camera device according to an embodiment of the present disclosure when viewing from a lower front side, with a front-side cover plate and a flexible substrate being removed.
Figure 3:
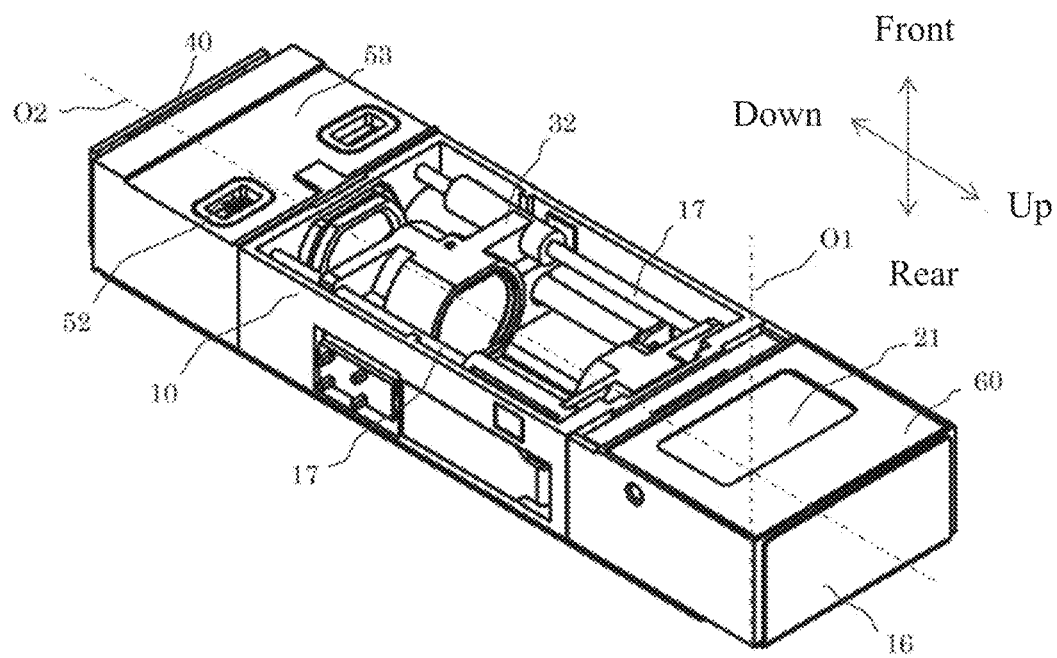
FIG. 3 is a perspective view of a deflected camera device according to an embodiment of the present disclosure when viewing from an upper front side, with a front-side cover plate and a flexible substrate being removed.

10: housing, 11: upper fixing portion, 12: front-side opening portion
13: lower opening portion, 14: lower fixing portion, 15: front-side cover plate
16: back-side cover plate, 17: shaft,
21: prism, 21-a: incidence surface of prism, 21-b: reflection surface of prism,
21-c: emission surface of prism
31: camera lens group, 32: camera lens frame, 33: focusing magnet yoke
34: focusing permanent magnet,
40: camera element unit, 41: camera element
50: flexible substrate for focusing and for a stepping motor and for an anti-shake mechanism,
51: focusing coil, 52: focusing Hall Sensor, 53: focusing housing,
54: stepping motor
60: anti-shake unit, 61: anti-shake base, 62: focusing ball, 621: first ball,
622: second ball, 63: inner frame portion of anti-shake base,
64: anti-shake unit cover, 65: cylindrical recessed portion of anti-shake base
71: first anti-shake coil, 72: first anti-shake Hall Sensor, 73: first anti-shake magnet yoke
74: second anti-shake coil, 75: second anti-shake Hall Sensor, 76: second anti-shake magnet yoke
77: shake elimination direction of first anti-shake magnet yoke
80: first holder block, 81: first holder, 82: first permanent magnet
83: outer frame portion of first holder, 84: cylindrical recessed portion of first holder
91: second holder, 92: second permanent magnet,
93: cylindrical recessed portion of second holder, 94: pin
100: deflected camera device, 200: portable information device,
O1: first optical axis, O2: second optical axis,
S1: first rotation axis, S2: second rotation axis.

DESCRIPTION OF EMBODIMENTS

The present disclosure will be further illustrated with reference to the accompanying drawings and the embodiments.

FIGS. 1 to 7 are diagrams showing a deflected camera device 100 according to the present disclosure.

FIGS. 1 to 16 illustrate a camera device and its elements according to some embodiments of the present disclosure.

A camera optical system of the deflected camera device 100 is a deflected optical system including, from an object side, a prism 21 as a reflection member, a camera lens group 31, and a camera element 41, and reflecting a light beam by the prism 21.

A light beam incident to an incidence surface 21-a of the prism 21 from an imaged subject along a first optical axis O1 is reflected by a reflection surface 21-b of the prism 21 towards a direction along a second optical axis O2 and is emitted from an emission surface 21-c. Then, the light beam passes through the camera lens group 31 located on the second optical axis O2 and forms an image on an image surface of the camera element 41.

Figure 4:
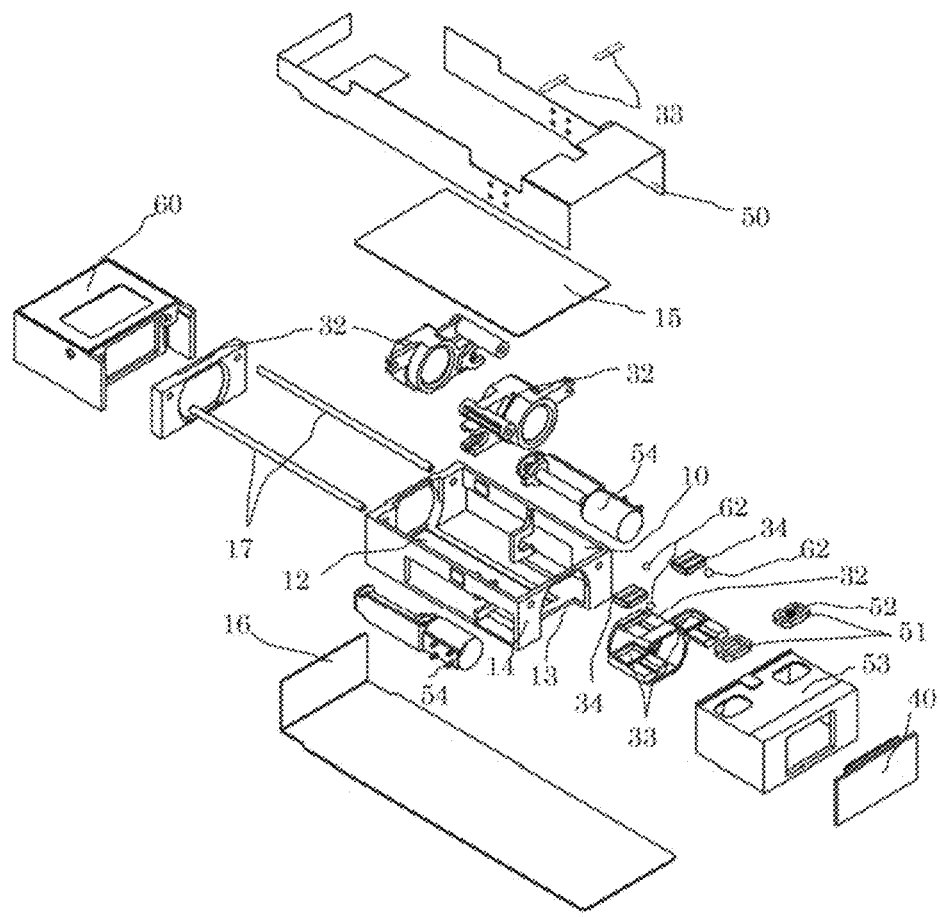
FIG. 4 is an exploded view of a deflected camera device according to an embodiment of the present disclosure when viewing from a lower front side.
Figure 5:
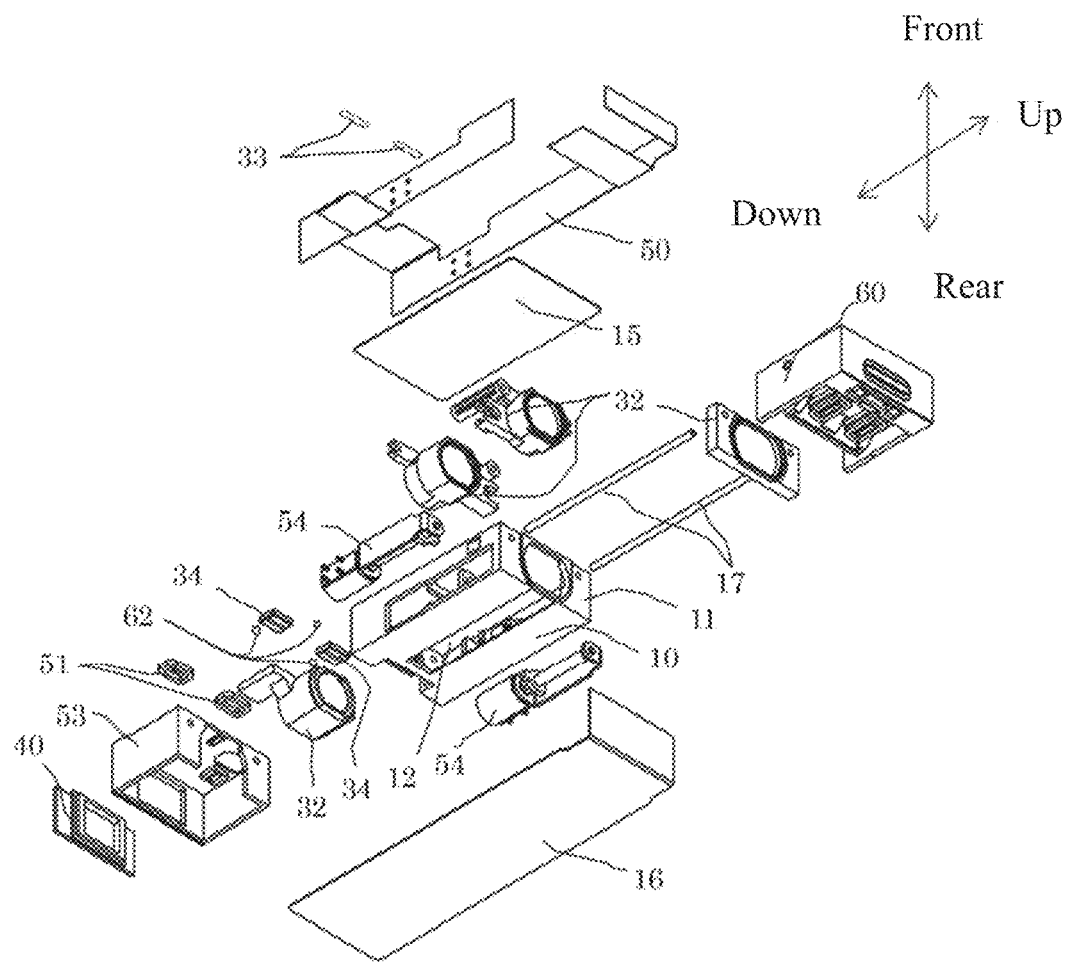
FIG. 5 is an exploded view of a deflected camera device according to an embodiment of the present disclosure when viewing from an upper rear side.
Figure 6:
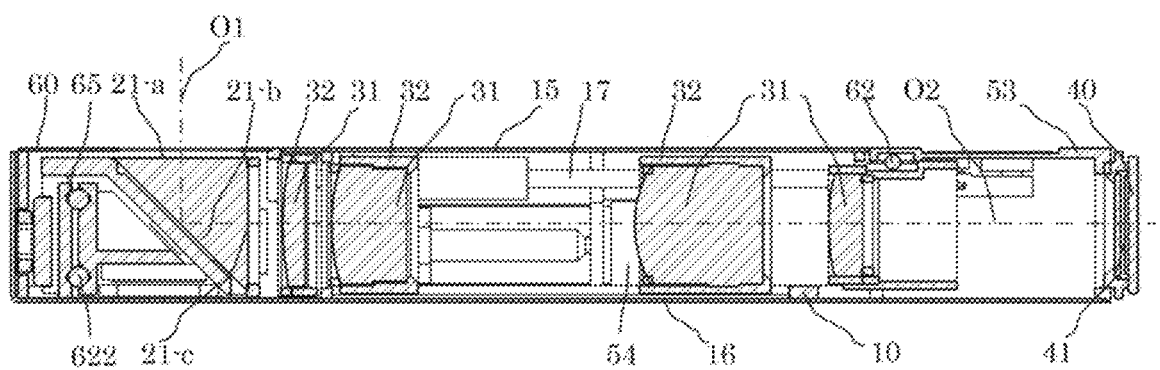
FIG. 6 is a cross-sectional view of a deflected camera device according to an embodiment of the present disclosure taken along a plane formed by a first optical axis and a second optical axis.
Figure 7:
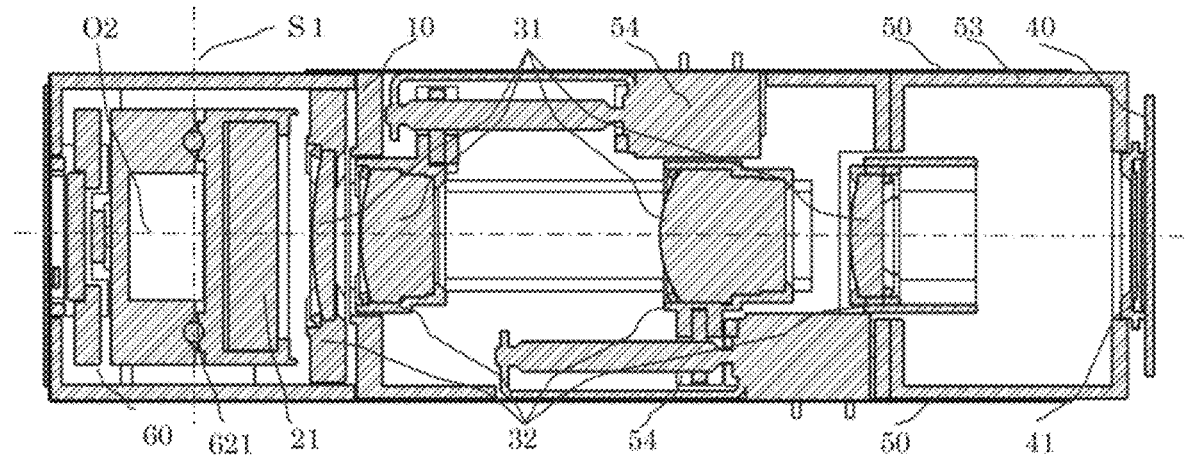
FIG. 7 is a cross-sectional view of a deflected camera device according to an embodiment of the present disclosure taken along a plane passing through a first rotation axis S1 and parallel to a second optical axis.
Figure 8:
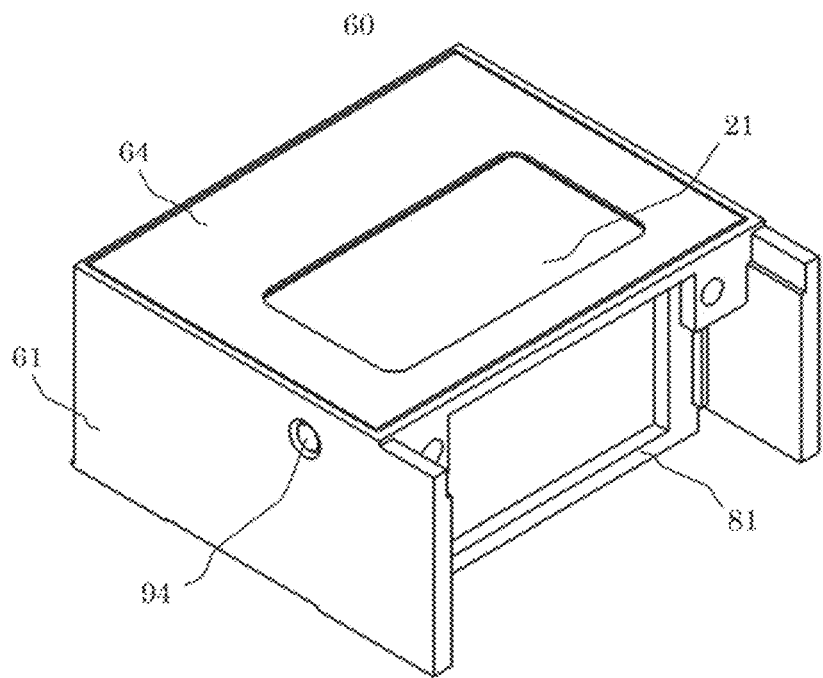
FIG. 8 is a perspective view of an anti-shake unit of a deflected camera device according to an embodiment of the present disclosure when viewing from a lower front side.
Figure 9:
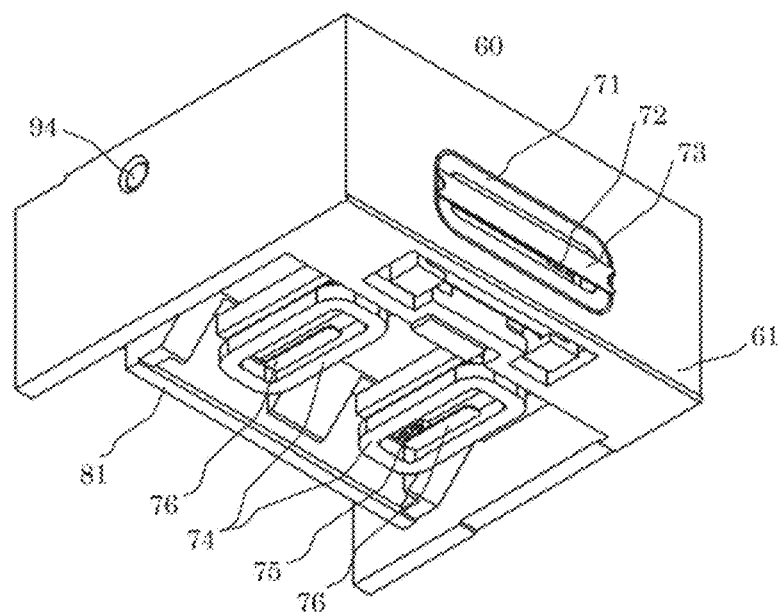
FIG. 9 is a perspective view of an anti-shake unit of a deflected camera device according to an embodiment of the present disclosure when viewing from an upper rear side.
Figure 10:
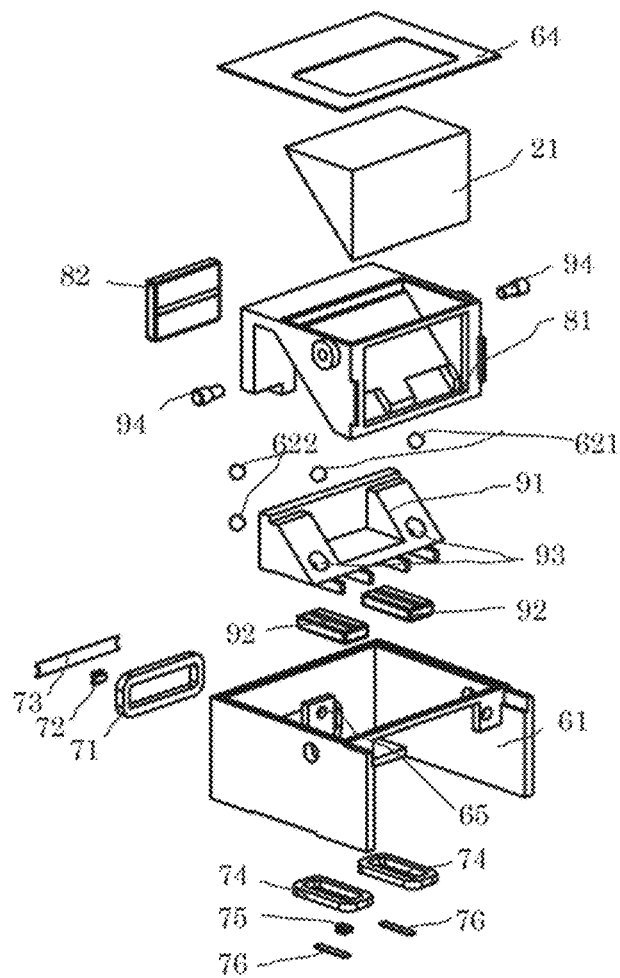
FIG. 10 is an exploded view of an anti-shake unit of a deflected camera device according to an embodiment of the present disclosure when viewing from a lower front side.
Figure 11:
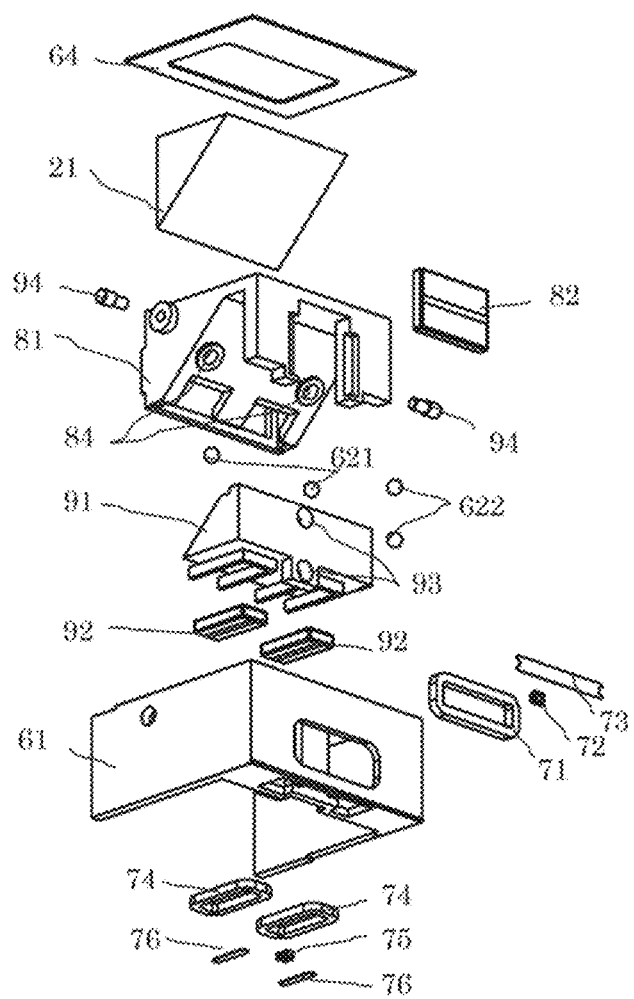
FIG. 11 is an exploded view of an anti-shake unit of a deflected camera device according to an embodiment of the present disclosure when viewing from an upper rear side.
Figure 12:
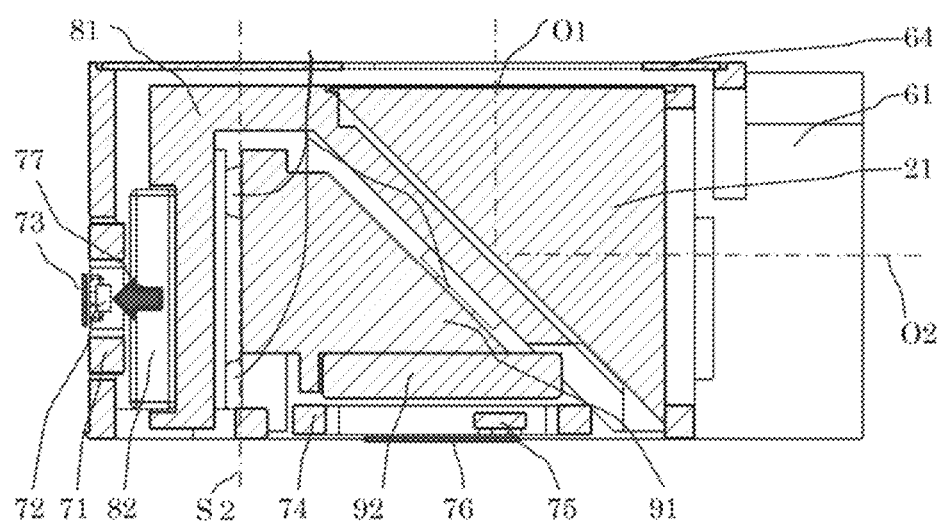
FIG. 12 is a cross-sectional view of an anti-shake unit of a deflected camera device according to an embodiment of the present disclosure when shifting from a plane formed by a first optical axis and a second optical axis to a plane passing through a driving member.
Figure 13:
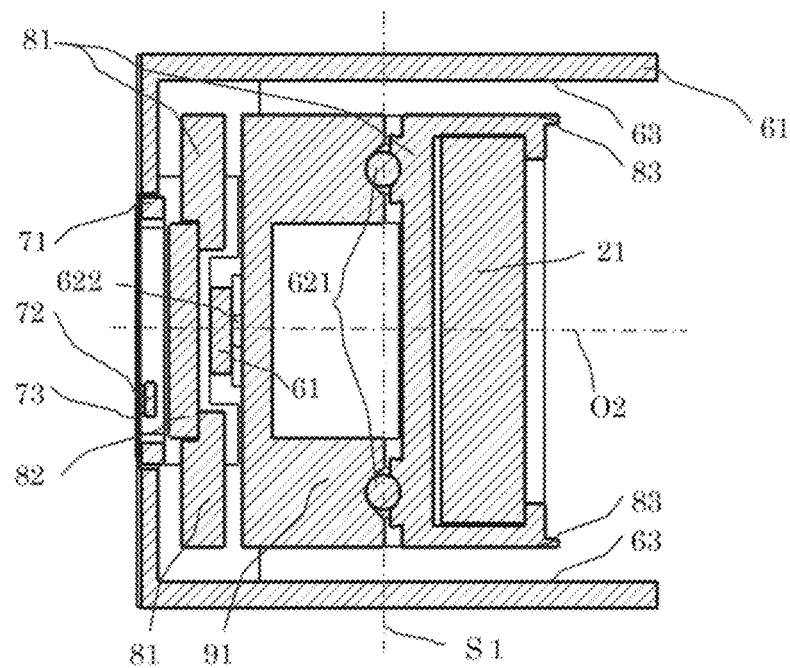
FIG. 13 is a cross-sectional view of an anti-shake unit of a deflected camera device according to an embodiment of the present disclosure taken along a plane passing through a first rotation axis S1 and parallel to a second optical axis.
Figure 14:
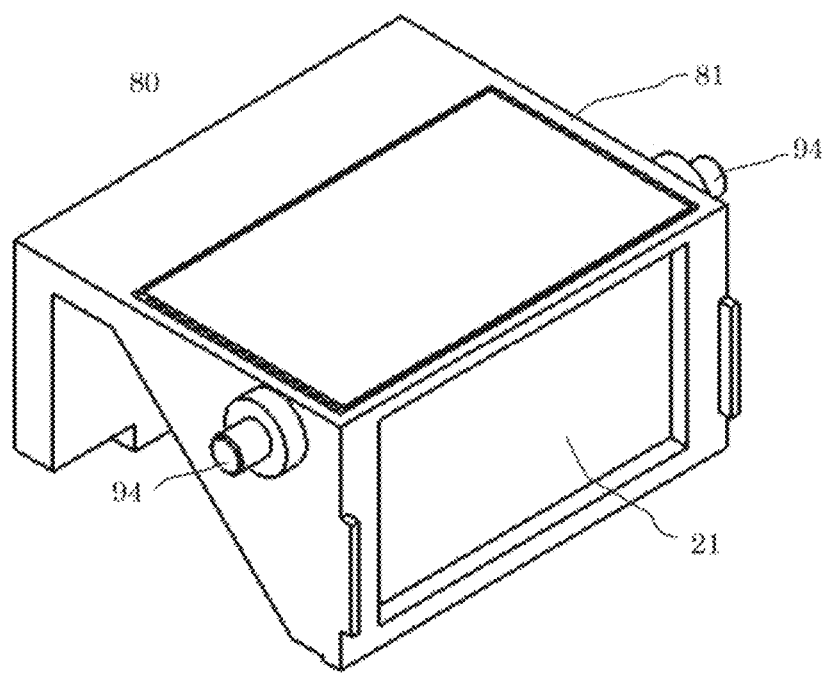
FIG. 14 is a perspective view of a first holder block of a deflected camera device according to an embodiment of the present disclosure when viewing from a lower front side.
Figure 15:
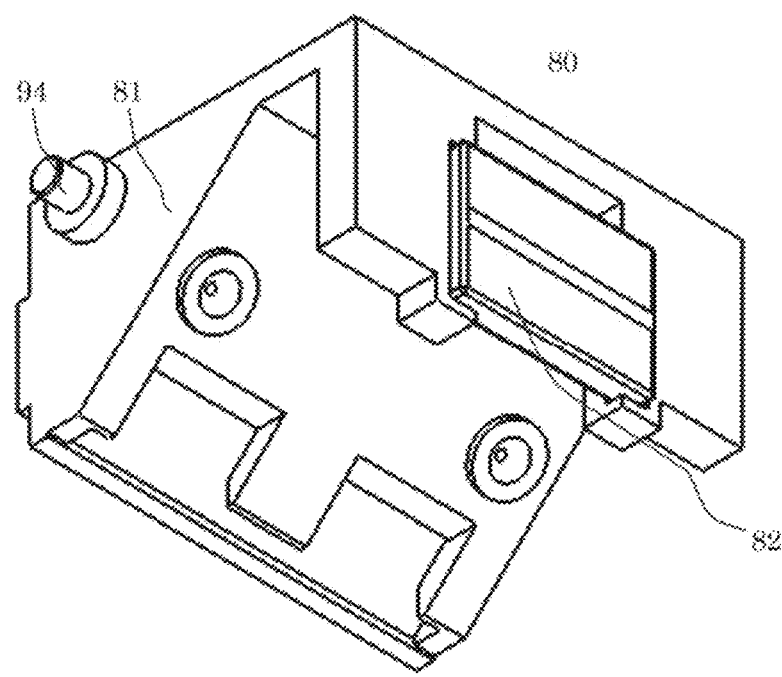
FIG. 15 is a perspective view of a first holder block of a deflected camera device according to an embodiment of the present disclosure when viewing from an upper rear side.

The deflected camera device 100 includes a housing 10. As shown in FIG. 4 and FIG. 5, the housing 10 includes an upper fixing portion 11 holding an anti-shake unit 60 that includes the prism 21 and an anti-shake base 61 as a base member, a box-shaped front-side opening portion 12 opening in a front-rear direction, a lower opening portion 13 directing the light beam to the camera element, and a lower fixing portion 14 holding a focusing housing 53. The anti-shake unit 60 including the prism 21 is fixed to the upper fixing portion 11. In the front-side opening portion 12, a camera lens frame 32 holding multiple camera lens groups 31 is supported by two shafts 17 and is held in such a manner that it can advance and retract along the second optical axis O2. In the lower opening portion 13, the focusing housing and a camera element unit 40 are fixed in a direction perpendicular to the second optical axis O2 of the light beam emitted from the camera lens group 31.

The front-side opening portion 12 of the housing 10 is clogged by a front-side cover plate 15 and a rear-side cover plate 16 (FIG. 1, FIG. 4, and FIG. 5).

In the box-shaped front-side opening portion 12, the camera lens frame 32 holding the camera lens group 31 is supported by two shafts 17 so as to be able to move linearly along the second optical axis O2, and multiple camera lens frames 32 are driven to advance and retract along the second optical axis O2 by a driving force generated by a stepping motor 54 fixed to the camera lens frame 32, the driving force being caused by energization of a flexible substrate 50 for focusing and for the stepping motor and for the anti-shake mechanism, thereby performing a zooming.

The camera lens frame 32, a focusing permanent magnet 34, and a focusing ball 62 that are received in the focusing housing 53 perform the zooming by utilizing a driving of a focusing coil 51 caused by the energization of the flexible substrate 50 for focusing and for the stepping motor and for the anti-shake mechanism.

A focusing magnet yoke 33 is provided on a side of the focusing coil 51 that does not face the focusing permanent magnet 34, and it is fixed to the focusing housing 53.

The focusing magnet yoke 33 plays a role of a magnetic spring for returning the camera lens group 31 to a given position when the camera lens group 31 moves as a result of a change of a focus position, and it also plays a role of applying a force towards one direction with respect to the focusing housing 53, and a role of improving efficiencies of electromagnetic actions of the focusing permanent magnet 34 and the focusing coil 51 by causing leakage magnetic flux of the focusing coil 51 to converge.

By providing a focusing Hall sensor 52, a position of the focusing permanent magnet 34 can be detected, thereby achieving adjustment to the focus position with higher accuracy, and accurate control in situations where a speed of the focus adjustment is relatively important.

The focusing coil 51 can be a coil winding mounted on and fixed to the camera lens frame 32 or can be a conductive pattern formed directly on the flexible substrate 50.

The deflected camera device 100 includes the anti-shake (image shake correction) unit 60 that reduces image shake on an image surface caused by shake such as hand-shake. This anti-shake unit 60 is so configured that it can enable the prism 21 to rotate around a first rotation axis S1 and an second axis S2, the first rotation axis S1 being perpendicular to a plane defined by the second optical axis O2 of the camera lens group and the first optical axis O1 at the object side reflected by the reflection member, and the second axis S2 being parallel to the first optical axis O1 on the reflected object side as rotation axes.

The prism 21 is fixed to a first holder 81 by bonding or the like. A first permanent magnet 82 is fixed to the first holder 81 by bonding or the like, and a pin 94 is pressed into the anti-shake base 61 after the first holder is assembled to the anti-shake base 61. This block is referred to as a first holder block 80.

The first holder block 80 is shafted-supported at the first rotation axis S1 axis of a second holder 91 by a first ball 621. The first ball 621 is maintained in a state in which it can rotate in a S1 axis hole portion of the second holder 91, and it is set to a size with which it can smoothly rotate relative to the second holder 91. The reflection surface 21-b of the prism 21 is configured to be axisymmetric about the first rotation axis S1 axis of the second holder 91.

A first anti-shake magnet yoke 73 and a second anti-shake magnet yoke 76 that are made of a magnetic metal are respectively adhered to back surfaces of a first anti-shake coil 71 and an second anti-shake coil 74 of the flexible substrate 50 for focusing and for the stepping motor and for the anti-shake mechanism.

Two second permanent magnets 92 are mounted on the second holder 91 and constitute a voice coil motor together with the second anti-shake coil 74 mounted on the anti-shake base 61. In addition, the second anti-shake magnet yoke 76 made of the magnetic metal and used as a magnet yoke that attracts the second permanent magnet 92 with each other is adhered on a back surface of the second anti-shake coil 74 on the flexible substrate 50 for focusing and for the stepping motor and for the anti-shake mechanism. The second anti-shake magnet yoke 76 functions as a magnetic spring that is held at a given position (a center of the movement range in the embodiment) by the magnetism with the second permanent magnet 92 of the second holder 91.

The anti-shake base 61 is further amounted to the flexible substrate 50 for focusing and for the stepping motor and for the anti-shake mechanism. The flexible substrate 50 for focusing and for the stepping motor and for the anti-shake mechanism is provided with a first anti-shake coil 71 and an first anti-shake Hall sensor 72 that is for position detection. The first anti-shake coil 71 and first anti-shake Hall sensor 72 are fixed at positions shown in the drawing, so that the first permanent magnet 82 of the first holder block 80 and the first anti-shake coil 71 together constitute a voice coil motor, and the first permanent magnet 82 of the first holder block 80 and the first anti-shake Hall sensor 72 together function as a position detection portion.

The first holder 81 includes a cylindrical recessed portion 84 holding the first ball 621 and slides relative to the second holder 91 with the first ball member. In addition, a cylindrical recessed portion 93 of the second holder is also provided in an opposite portion of the second holder 91. Further, a cylindrical recessed portion 65 of the anti-shake base and the cylindrical recessed portion 93 of the second holder are respectively formed on a portion of the anti-shake base 61 and a portion of the second holder 91 that are opposite to each other, and a sliding surface of the cylindrical recessed portion 84 of the first holder 81 is similarly configured with surface accuracy so that it can smoothly rotate.

The second holder 91 and the first holder block 80 are inserted into the anti-shake base 61 and are shaft-supported at the second rotation axis S2 axis by a second ball 622. The second ball 622 is maintained in a state in which it is capable of rotating in a S2 axis hole portion of the anti-shake base, and it is set to a size with which it is capable of rotating smoothly with respect to the anti-shake base 61. Further, by inserting the pin 94 into the first holder 81 in this state, a movement range of the first holder block 80 in the rotation direction relative to the anti-shake base 61 is limited. The reflection surface 21-*b* of the prism 21 is configured to be symmetrical about the second rotation axis S2.

In addition, a certain gap is provided in the rotation direction between an outer frame portion 83 of the first holder 81 and an inner frame portion 63 of the anti-shake base 61, so as to limit a movement range in the rotation direction of the first holder block 80 relative to the second holder 91.

This unitized block is referred to as an anti-shake unit 60.

Besides, in this case, the first rotation axis S1 can be located as close to the reflection surface 21-*b* of the prism as possible.

It is considered that in a case where the prism 21 has a shake component in a direction parallel to the first optical axis O1, the second optical axis O2 is capable of moving in parallel to generate image shake that can not be controlled by a hand-shake correction. Therefore, in the present embodiment, it is necessary to eliminate the shake component in a direction parallel to the rotation axis of the first holder block 80.

In the present disclosure, by applying a force on the first holder block 80 through a magnetic spring in a direction parallel to the rotation axis with respect to the second holder 91 and applying the ball to the sliding portion, it is possible to reliably eliminate the shake with a low load.

Similar to the shake elimination direction 77 of the first anti-shake magnet yoke 73, the shake elimination direction is consistent with a direction in which a distance between the first permanent magnet 82 and the first anti-shake Hall sensor 72 is determined, so that a stable position detection can be performed. The first anti-shake magnet yoke 73 on a side opposite to the first permanent magnet 82 of the first holder block 80 is thinner than the first permanent magnet 82, so as to generate an attractive force for centrally holding the first holder block 80. That is, in a case where the first holder block 80 rotates, it functions as a magnetic spring that is held at the given position (the center of the movement range in the embodiment) by magnetism.

As described above, the second holder 91 is held on the anti-shake base 61 by the second ball 622 in such a way that it freely rotates around the second rotation axis S2. The first holder block 80 is held on the second holder 91 by the first ball 621 in such a way that it freely rotates around the first rotation axis S1.

In addition, a force is applied to the first permanent magnet 82 disposed on the first holder 81 towards a direction of the first anti-shake magnet yoke 73 disposed on the anti-shake base 61. The first anti-shake magnet yoke 73 has a function of holding the center of the rotation axis S2, preventing falling off via the second holder 91, and eliminating shake between the blocks, and it also has a function of effectively and actively using the leakage magnetic flux of the first anti-shake coil 71 as the driving force, so that it is possible to reduce the number of members significantly.

In addition, by disposing an electromagnetic actuator on an outermost surface of the anti-shake unit 60 via the first ball 621 and the second ball 622, an origin of force is located at a position facing away from the first rotation axis S1 and the second rotation axis S2, so that it is possible to reduce sensitivity of the force generated by the electromagnetic actuator, that is, it is possible to perform anti-shake control with higher resolution.

In an embodiment, the reflection member can be a mirror (not shown in the drawing).

Figure 16:
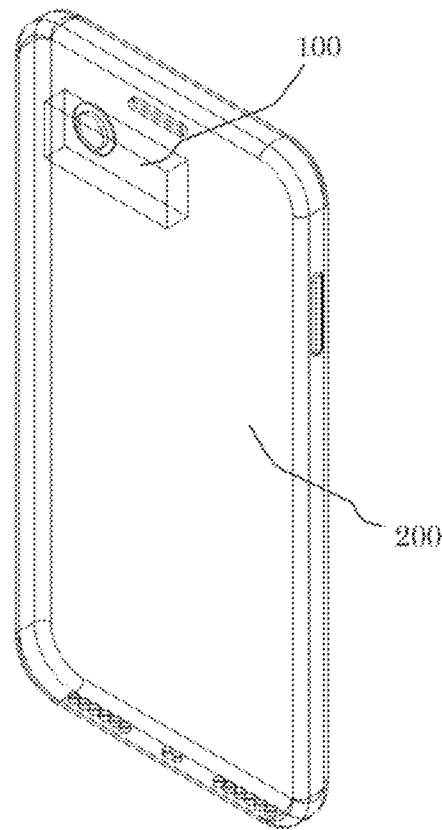
FIG. 16 is a portable electronic device (portable information terminal) provided with a deflected camera device according to the present disclosure.

The deflected camera device 100 can also be the camera device 100 applied to a portable information device 200 such as a smartphone, a feature phone, or a tablet device shown in FIG. 16.

The above are only exemplary embodiments of the present disclosure, and a protection scope of the present disclosure is not limited to the above embodiments. Equivalent modifications or deformations made by those skilled in the art based on disclosed content of the present disclosure are all included in the present disclosure described in the claims of the present disclosure.

What is claimed is:

1. An anti-shake mechanism of a deflected camera device, the deflected camera device comprising an optical system, the optical system comprising a reflection member, and the anti-shake mechanism being configured to perform a hand-shake correction by rotating the reflection member in the deflected camera device, wherein the reflection member comprises a reflection surface configured to deflect an optical axis; the reflection member is arranged closer to an object side than camera lens groups in such a manner that the reflection member rotates around a first rotation axis and a second rotation axis being rotation axes, the first rotation axis being an axis perpendicular to a plane defined by an optical axis of the camera lens groups and an optical axis at the object side reflected by the reflection member, and the second rotation axis being an axis parallel to the reflected optical axis at the object side;

a ball member is used as a sliding portion that enables the reflection member to smoothly rotate; and an electromagnetic actuator is provided to drive a driving member for rotation, and the electromagnetic actuator comprises a mechanism for holding the sliding portion and a shake elimination mechanism;

a force applying direction of the electromagnetic actuator as a force applying unit is the same as a direction in which at least one permanent magnet and at least one magnet yoke of the electromagnetic actuator attract each other;

the at least one magnet yoke is arranged on an anti-shake base;

the mechanism for holding the sliding portion comprises a first holder provided with a first permanent magnet and a second holder provided with a second permanent magnet, the first holder is held on the second holder through a first ball member in such a manner that the first holder freely rotates around the first rotation axis, the second holder is held on the anti-shake base by a second ball member in such a manner that the second holder freely rotates around the second rotation axis, the ball member comprises the first ball member and the second ball member different from the first ball member, and the at least one permanent magnet comprises the first permanent magnet and second permanent magnet; and with respect to the at least one magnet yoke arranged on the anti-shake base, the first permanent magnet of the first holder presses the first ball member and second ball member across the second holder by an attraction between the first permanent magnet and the at least one magnet yoke.

2. The anti-shake mechanism of the deflected camera device as described in claim 1, wherein the reflection surface of the reflection member is symmetrical with respect to the first rotation axis and the second rotation axis, and the anti-shake mechanism is equipped with the electromagnetic actuator at an outermost portion.

3. The anti-shake mechanism of the deflected camera device as described in claim 2, wherein the electromagnetic actuator is a voice coil motor.

4. The anti-shake mechanism of the deflected camera device as described in claim 2, wherein a device that changes an optical power of an image surface by moving two or more lens groups of the camera lens groups in the deflected optical axis is provided in the camera lens groups.

5. The anti-shake mechanism of the deflected camera device as described in claim 2, wherein the reflection member is a prism or a mirror.

6. The anti-shake mechanism of the deflected camera device as described in claim 1, wherein the electromagnetic actuator is a voice coil motor.

7. The anti-shake mechanism of the deflected camera device as described in claim 1, wherein a device that changes an optical power of an image surface by moving two or more lens groups of the camera lens groups in the deflected optical axis is provided in the camera lens groups.

8. The anti-shake mechanism of the deflected camera device as described in claim 1, wherein the reflection member is a prism.

9. The anti-shake mechanism of the deflected camera device as described in claim 1, wherein the reflection member is a mirror.

10. A camera comprising an anti-shake mechanism of a deflected camera device the deflected camera device comprising an optical system, the optical system comprising a reflection member, and the anti-shake mechanism being configured to perform a handshake correction by rotating the reflection member in the deflected camera device,
   wherein the reflection member comprises a reflection surface configured to deflect an optical axis;
   the reflection member is arranged closer to an object side than camera lens groups in such a manner that the reflection member rotates around a first rotation axis and a second rotation axis being rotation axes, the first rotation axis being an axis perpendicular to a plane defined by an optical axis of the camera lens groups and an optical axis at the object side reflected by the reflection member, and the second rotation axis being an axis parallel to the reflected optical axis at the object side;
   a ball member is used as a sliding portion that enables the reflection member to smoothly rotate; and
   an electromagnetic actuator is provided to drive a driving member for rotation, and the electromagnetic actuator comprises a mechanism for holding the sliding portion and a shake elimination mechanism;
   a force applying direction of the electromagnetic actuator as a force applying unit is the same as a direction in which at least one permanent magnet and at least one magnet yoke of the electromagnetic actuator attract each other;
   the at least one magnet yoke is arranged on an anti-shake base;
   the mechanism for holding the sliding portion comprises a first holder provided with a first permanent magnet and a second holder provided with a second permanent magnet, the first holder is held on the second holder through a first ball member in such a manner that the first holder freely rotates around the first rotation axis, the second holder is held on the anti-shake base by a second ball member in such a manner that the second holder freely rotates around the second rotation axis, the ball member comprises the first ball member and the second ball member different from the first ball member, and the at least one permanent magnet comprises the first permanent magnet and second permanent magnet; and
   with respect to the at least one magnet yoke arranged on the anti-shake base, the first permanent magnet of the first holder presses the first ball member and second ball member across the second holder by an attraction between the first permanent magnet and the at least one magnet yoke.

11. The camera as described in claim 10, wherein the reflection surface of the reflection member is symmetrical with respect to the first rotation axis and the second rotation axis, and the anti-shake mechanism is equipped with the electromagnetic actuator at an outermost portion.

12. The camera as described in claim 10, wherein the electromagnetic actuator is a voice coil motor.

13. The camera as described in claim 10, wherein a device that changes an optical power of an image surface by moving two or more lens groups of the camera lens groups in the deflected optical axis is provided in the camera lens groups.

14. The camera as described in claim 10, wherein the reflection member is a prism.

15. The camera as described in claim 10, wherein the reflection member is a mirror.

16. A portable electronic device comprising the camera as described in claim 10.

* * * * *